Patented Apr. 19, 1949

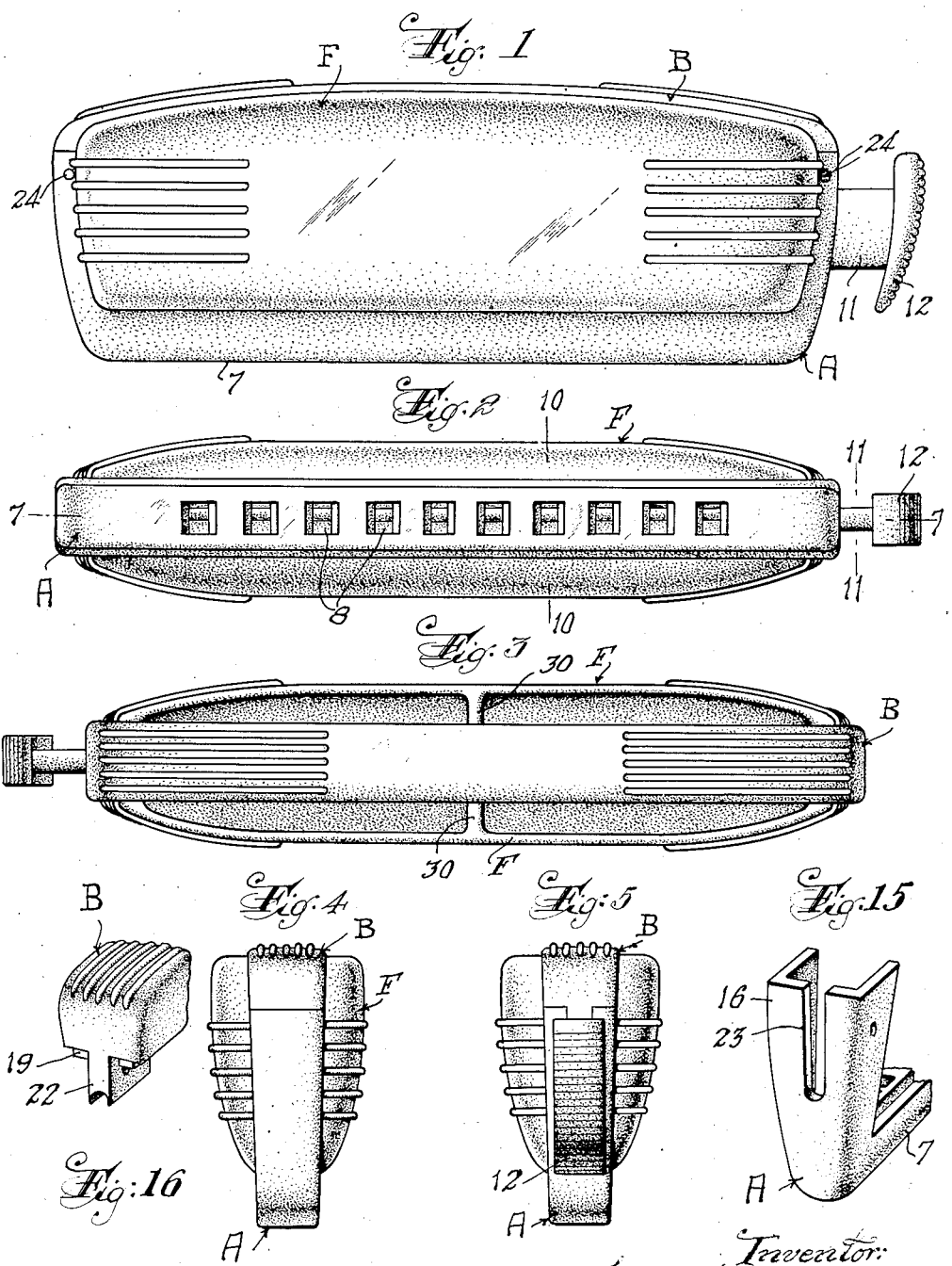

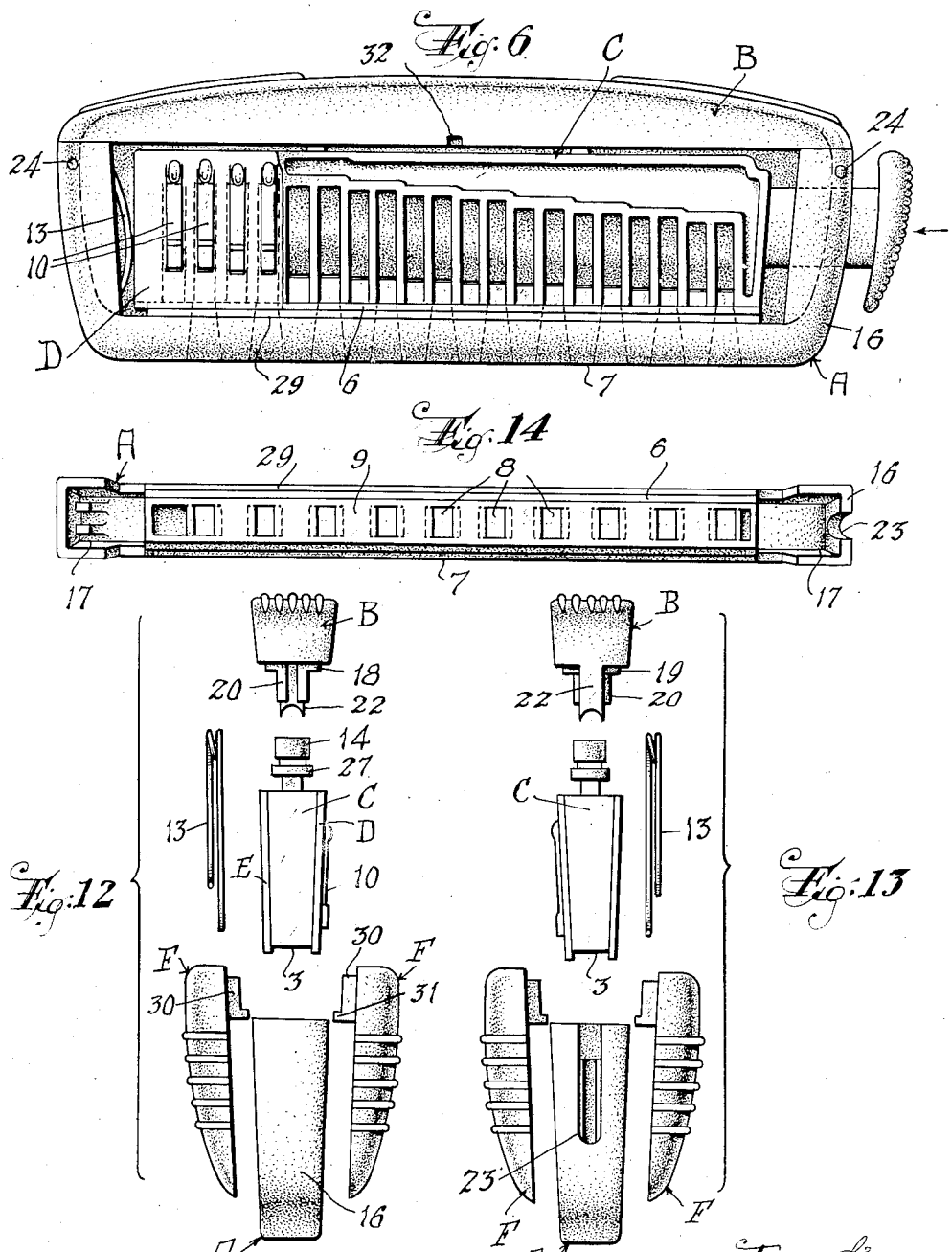

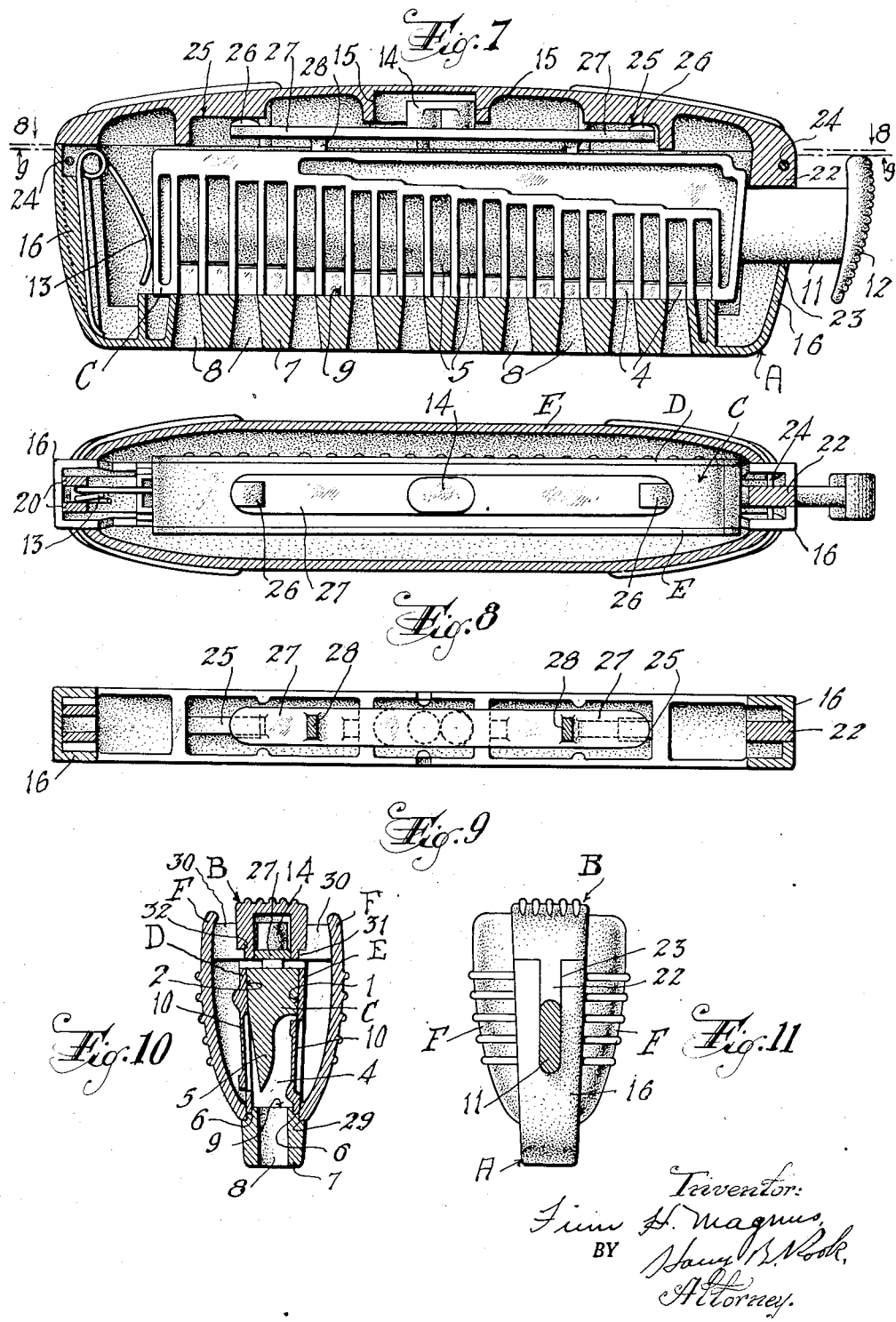

2,467,761

UNITED STATES PATENT OFFICE 2,467,761

PLASTIC CHROMATIC HARMONICA

Finn H. Magnus, Essex Fells, N. J., assignor, by mesne assignments, to Reconstruction Finance Corporation, New York, N. Y., a corporation of the United States Application April 30, 1947, Serial No. 745,064

8 Claims. (Cl. 84—377)

1

This invention relates in general to harmonicas by which a chromatic scale can be played, and more particularly the invention contemplates a chromatic harmonica formed of plastic material and wherein the reed plates are shiftable relative to mouthpiece openings to selectively play full tones and half tones, as broadly described and claimed in my Patent No. 2,340,333, dated February 1, 1944.

One object of the invention is to provide a chromatic harmonica which shall embody novel and improved features of construction whereby all parts of the instrument except a spring can be formed of a plastic composition, for example, a synthetic resin such as polystyrene.

Another object is to provide in a chromatic harmonica a novel and improved construction and combination of a casing having a mouthpiece formed with a plurality of openings, reed plates and means for mounting said reed plates in the casing for movement relatively to said mouthpiece openings, whereby different reeds can be selectively brought into register with said openings in the mouthpiece.

A further object is to provide such a harmonica the casing of which shall be formed of a plurality of sections which can be easily and quickly assembled and disassembled for interchanging or repair of the reed plates.

Still another object is to provide a chromatic harmonica embodying a slidable reed plate, which shall be so constructed as to be easily playable and devoid of objectionable noises which are frequently incidental to contact of relatively movable parts.

Other objects are to provide a chromatic harmonica which shall include a minimum number of simple and relatively inexpensive parts; and to obtain other objects and advantages as will be brought out by the following description in conjunction with the accompanying drawings, in which Figure 1 is a plan view of a plastic chromatic harmonica constructed in accordance with my invention;

Figure 2 is a side elevational view thereof, viewing the instrument from the front or mouthpiece side;

Figure 3 is a similar view of the rear side of the harmonica;

Figure 4 is an elevational view of one end of the harmonica;

Figure 5 is a similar view of the other end;

Figure 6 is a plan view similar to Figure 1, with the top cover and a portion of the reed plate removed;

Figure 7 is a horizontal sectional view, approximately on the plane of the line 7—7 of Figure 2, but showing one of the reed plates removed and the wind cell block in plan view;

Figure 8 is a vertical sectional view, approximately on the plane of the line 8—8 of Figure 7;

Figure 9 is a similar view, on the line 9—9, looking in the direction of the arrows;

Figure 10 is a transverse sectional view, approximately on the plane of the line 10—10 of Figure 2;

Figure 11 is a sectional view, approximately on the plane of the line 11—11 of Figure 2;

Figure 12 is an exploded end elevational view of the parts of the harmonica in disassembled relation;

Figure 13 is a similar view, illustrating the instrument from the opposite end;

Figure 14 is a detached inside elevational view of the mouthpiece section of the casing;

Figure 15 is a perspective view of one end of the mouthpiece section of the casing, and Figure 16 is a similar view of the corresponding end of the back piece of the casing.

Specifically describing the illustrated embodiment of the invention, the harmonica comprises a casing which includes a front or mouthpiece section A and a back section B which form a frame or support guide for the wind cell block C and the reed plates D and E. The casing also includes sections F which overlie the opening formed between the front section and the back section so as to cover or enclose the wind cell block and reed plates.

All of these parts preferably are formed of a plastic composition, such as polystyrene, and each part is molded in one piece. More particularly, the wind cell block C is approximately trapezoidal in cross-section and has its opposed broad surfaces 1 and 2 converging toward each other and meeting the narrower front edge 3 of the block to receive the respective blow or exhale reed plate E and the draw or inhale reed plate D. These reed plates may be secured to the wind cell block in any suitable manner, but where they are formed of a synthetic resin, preferably a solvent is applied to the contacting surfaces of the parts to soften the resin on said surfaces, after which the parts are pressed into snug contact with each other. The wind cell block has a plurality of wind cells 4 each of which is common to a draw reed and a blow reed, said cells being in the form of slots which open through the front side 3 of the block so as to register with openings in the mouthpiece to be hereinafter described. Each cell is preferably divided by a web or partition 5 to form separate wind chambers for the corresponding blow and draw reeds. This construction is described and claimed in my copending application Serial No. 745,063, filed April 30, 1947.

Preferably, the front edge of each reed plate extends beyond the front side of the wind cell block to slidably seat in a groove 6 formed between the mouthpiece section A and the corresponding cover section F, as best shown in Figures 10 and 12.

The mouthpiece section A includes a bar-like front portion 7 which actually constitutes the mouthpiece and has a plurality of wind openings 8, the inner side of said bar-like portion having a smooth surface 9 over which the front side 3 of the wind cell block is freely slidable. The number of wind cells 4 in the wind cell block is preferably double the number of the openings 8, so that each two adjacent wind cells may be brought selectively into register with one of the openings 8, as best shown in Figure 7. Each reed plate has a number of reeds 10 corresponding to the number of wind cells 4, and while the reeds may be arranged in any suitable manner and may be tuned as desired, I prefer to arrange full tone reeds and half tone reeds in alternate relation on each reed plate, each plate thus having two sets of reeds, one set being tuned to the full tones while the other set is tuned to the half tones.

With this construction, it will be observed that normally the full tone reed wind cells will be in register with the mouthpiece openings 8, as shown in Figure 7, and that upon movement of the wind cell block and reed plates longitudinally to the left in Figure 7, the half tone reed wind cells will be brought into register with said openings, as shown in Figure 6. For so sliding the wind cell block, it is formed with a handle bar 11 which projects from one end of the casing and has a hand-piece 12 thereon, while a spring 13 may be provided for sliding the wind cell block in the opposite direction. A stop stud 14 is provided on the wind cell block to abut stop shoulders 15 on the back piece for limiting sliding of the wind cell block in both directions.

The mouthpiece section A has end arms 16, the free extremities of which have recesses 17 into one of which is fitted a lug 18 at one end of the back piece B and into the other of which is fitted a lug 19 on the other end of the back piece. Depending from the lug 18 are two parallel spaced tongues 20, which when the back piece is attached to the front piece aline with a groove 21 in one arm 16 of the front piece to provide a seat for a spring 13. Depending from the lug 19 is a tongue 22 which fits into a slot 23 which opens through the free end of the other arm 16 of the front piece through which extends the handle bar 11 of the wind cell block, said tongue 22 serving to cooperate with the slot in guiding the handle bar and also to prevent displacement of the handle bar from the slot. To facilitate quick attachment and detachment of the back piece B from the arms of the front piece, removable pins 24 are inserted through openings in the respective arms 16 and the tongues 20 and 22.

The back piece B serves also as a guide for the wind cell block C, and as shown, the back piece has two smooth guide surfaces 25 on which frictionally slide bearing elements 26 mounted on spring arms 27 which may be cast integrally with the wind cell block, and for lightness in construction are connected to the block only by narrow webs 28. When the back piece B is connected to the front piece, the arms 27 are placed under tension which resiliently frictionally holds the front edge 3 of the wind cell block in contact with the surface 9 of the mouthpiece.

The cover plates F complement the front and back pieces A and B to complete the casing of the harmonica and particularly to protect the reeds and wind cell block against injury. These cover plates may be secured to the casing in any suitable manner, but preferably are connected to only the front piece A so that the back piece can be removed without affecting the cover plates. As shown, the front piece has rabbets 29 at opposite sides thereof in which the edges of the corresponding covers are seated, while the end edges of the covers simply contact with the outer surfaces of the arms of the front piece. Desirably, the covers may be adhesively secured to the front piece, as by the use of a solvent for the plastic material for softening the contacting surfaces of the parts. The rear edges of the covers are in spaced relation to the back piece so as to provide outlets for the sound chambers that are formed between the covers and the respective reed plates, as best shown in Figures 3 and 9, and to reenforce said rear edges of the covers against pressure, each cover may have a leg 30 to separably abut the back piece B, and to form a stable abutment each leg 30 may have a toe 31 seated in a notch 32 in the back piece.

With this construction, it will be observed that if the reeds are tuned to the chromatic scale, the full tone and half tone notes can be played selectively by proper manipulation of the wind cell block through the hand piece 12. Furthermore, it will be observed that the wind cell block and reed plates can be easily assembled in and disassembled from the casing, it being necessary only to apply and remove the back piece and slide the wind cell block into or out of the front piece, as the case may be.

If desired, suitable means to reduce the shock and noise incident to contact of the stop lug 14 with the stop shoulders 15 may be provided. For example, a rubber sleeve could be slipped over the lug 14 or resilient pads could be attached to either the lug or the shoulders 15.

While I have shown and described the invention as embodied in certain details of construction, it should be understood by those skilled in the art that the structural features of the harmonica may be widely modified and changed within the spirit and scope of the invention.

Having thus described the invention, what I claim is:

1. A harmonica comprising a casing having front and back sections secured together and forming parallel guides for a wind cell block, a wind cell block reciprocably mounted in said guides, said front section having a portion forming a mouthpiece with wind holes therethrough, said wind cell block having two opposite longitudinal edges, a pair of wind cells opening through one of said two longitudinal edges of said block for each hole, and means resiliently holding said one edge of said block in sliding contact with said mouthpiece.

2. A harmonica comprising a casing having front and back sections secured together and forming parallel guides for a wind cell block, a wind cell block reciprocably mounted in said guides, said front section having a portion forming a mouthpiece with wind holes therethrough, said wind cell block having two opposite longitudinal edges and a pair of wind cells opening through one of said two opposite longitudinal edges of said block for each hole, said block having spring means slidably engaging said back section to resiliently hold said one edge of said block in slidable contact with said mouthpiece.

3. The harmonica as defined in claim 1, wherein said wind cell block is molded of plastic composition and said means comprises integral spring arms projecting from the other of said two opposite longitudinal edges of said wind cell block and slidably abutting said back piece.

4. A harmonica comprising a casing having a U-shaped front section having a base portion and approximately parallel arms and the base portion of which forms a mouthpiece with wind holes therethrough, a back section secured to the arms of said front section said U-shaped front section and said back section forming an open frame for a wind cell block, a wind cell block within said frame having two opposite longitudinal edges, cooperating guide portions on said block, said base portion of said front section and said back section for reciprocably slidably mounting said wind cell block in said frame.

5. The harmonica as defined in claim 4, wherein said wind cell block has wind cells opening through opposite sides thereof and through one of said two opposite longitudinal edges and said edge slidably contacts said mouthpiece, there being a pair of wind cells for each wind hole, and a blow reed and a draw need for each wind cell.

6. The harmonica as defined in claim 5, wherein said casing also includes cover plates closing both sides of said open frame and in spaced relation to said wind cell block to form sound chambers opening outwardly between said cover plates and said back section.

7. The harmonica as defined in claim 5, wherein said casing also includes cover plates secured to opposite sides of said front section and closing both sides of said open frame to form sound chambers opening outwardly between said cover plates and said back section, said back section being separably connected to said arms of the front section to permit easy and quick insertion and removal of said wind cell block into and from said casing.

8. The harmonica as defined in claim 4, wherein one of said two opposite longitudinal edges of said wind cell block slidably engages said mouth piece and there is spring means between the other of said two opposite longitudinal edges of said block and said back section for resiliently holding the first-mentioned edge of the block in contact with said mouthpiece.

FINN H. MAGNUS.

REFERENCES CITED

The following references are of record in the file of this patent:

UNITED STATES PATENTS

| Number | Name | Date |
|--------|------|------|
| 574,625 | Paris | Jan. 5, 1897 |
| 872,083 | Reidy | Nov. 26, 1907 |
| 2,179,993 | Davies | Nov. 14, 1939 |
| 2,192,983 | Moore | Mar. 12, 1940 |
| 2,340,333 | Magnus | Feb. 1, 1944 |